(12) United States Patent
Chave et al.

(10) Patent No.: US 11,397,100 B2
(45) Date of Patent: Jul. 26, 2022

(54) METHOD FOR CALIBRATING A MAGNETIC LOCATOR

(71) Applicant: MINMAXMEDICAL, Gieres (FR)

(72) Inventors: Mickael Chave, Saint Egreve (FR); Loic Huguel, Grenoble (FR); Sandra Rousseau, Grenoble (FR)

(73) Assignee: MINMAXMEDICAL, Gieres (FR)

( * ) Notice: Subject to any disclaimer, the term of this patent is extended or adjusted under 35 U.S.C. 154(b) by 293 days.

(21) Appl. No.: 16/628,502

(22) PCT Filed: Jul. 5, 2018

(86) PCT No.: PCT/FR2018/051688
§ 371 (c)(1),
(2) Date: Jan. 3, 2020

(87) PCT Pub. No.: WO2019/008284
PCT Pub. Date: Jan. 10, 2019

(65) Prior Publication Data
US 2020/0182662 A1 Jun. 11, 2020

(30) Foreign Application Priority Data
Jul. 6, 2017 (FR) ........................................ 1756376

(51) Int. Cl.
*G01D 18/00* (2006.01)
*G01B 11/14* (2006.01)
*G01D 5/20* (2006.01)

(52) U.S. Cl.
CPC ............. *G01D 18/00* (2013.01); *G01B 11/14* (2013.01); *G01D 5/20* (2013.01)

(58) Field of Classification Search
CPC .... G01R 33/246; G01R 33/5608; G01V 3/10; G01V 3/081; G01V 3/08; E21B 47/13; E21B 10/42
See application file for complete search history.

(56) References Cited

U.S. PATENT DOCUMENTS

| 5,066,917 A | 11/1991 | Stolarczyk |
| 8,635,043 B1 | 1/2014 | Olsson et al. |

(Continued)

OTHER PUBLICATIONS

International Preliminary Report on Patentability received for PCT Patent Application No. PCT/FR2018/051688, dated Jan. 16, 2020, 16 pages (8 pages of English Translation and 8 pages of Original Document).

(Continued)

*Primary Examiner* — Jermele M Hollington
*Assistant Examiner* — Temilade S Rhodes-Vivour
(74) *Attorney, Agent, or Firm* — Thomas | Horstemeyer, LLP

(57) ABSTRACT

The invention relates to a method for calibrating a magnetic locator, said magnetic locator including at least a transmitter and a receiver, the calibration method involving a third sensor constituted of a transceiver, said method including, transmission of a first magnetic field by the transmitter and reception of first signals generated in the receiver by said magnetic field (S1), transmission of a second magnetic field by the transmitter and reception of second signals generated in the transceiver by said magnetic field (S2), transmission of a third magnetic field by the transceiver and reception of third signals generated in the receiver by said magnetic field (S3), the calibration method including the determination (S4) of at least a magnetic moment of the transmitter and a magnetic moment of the receiver from the first signals, second signals and third signals.

7 Claims, 1 Drawing Sheet

(56) References Cited

U.S. PATENT DOCUMENTS

| | | | |
|---|---|---|---|
| 2012/0078558 A1* | 3/2012 | Pelegri | G01V 13/00 702/85 |
| 2016/0097656 A1* | 4/2016 | Arumugam | G01S 1/08 324/207.17 |
| 2016/0209540 A1* | 7/2016 | Frey | G01V 3/18 |
| 2017/0176623 A1 | 6/2017 | Appleby et al. | |
| 2017/0261633 A1* | 9/2017 | Morris | E21B 44/00 |

OTHER PUBLICATIONS

International Search Report and Written Opinion received for PCT Patent Application No. PCT/FR2018/051688, dated Nov. 26, 2018, 20 pages (9 pages of English Translation and 11 pages of Original Document).

Preliminary Research Report received for French Application No. 1756376, dated Mar. 16, 2018, 4 pages (1 page of French Translation Cover Sheet and 3 pages of original document).

Zikmund et al., "Calibration of the 3-D Coil System's Orthogonality", IEEE Transactions on Magnetics, vol. 49, No. 1, Jan. 2013, pp. 66-68.

* cited by examiner

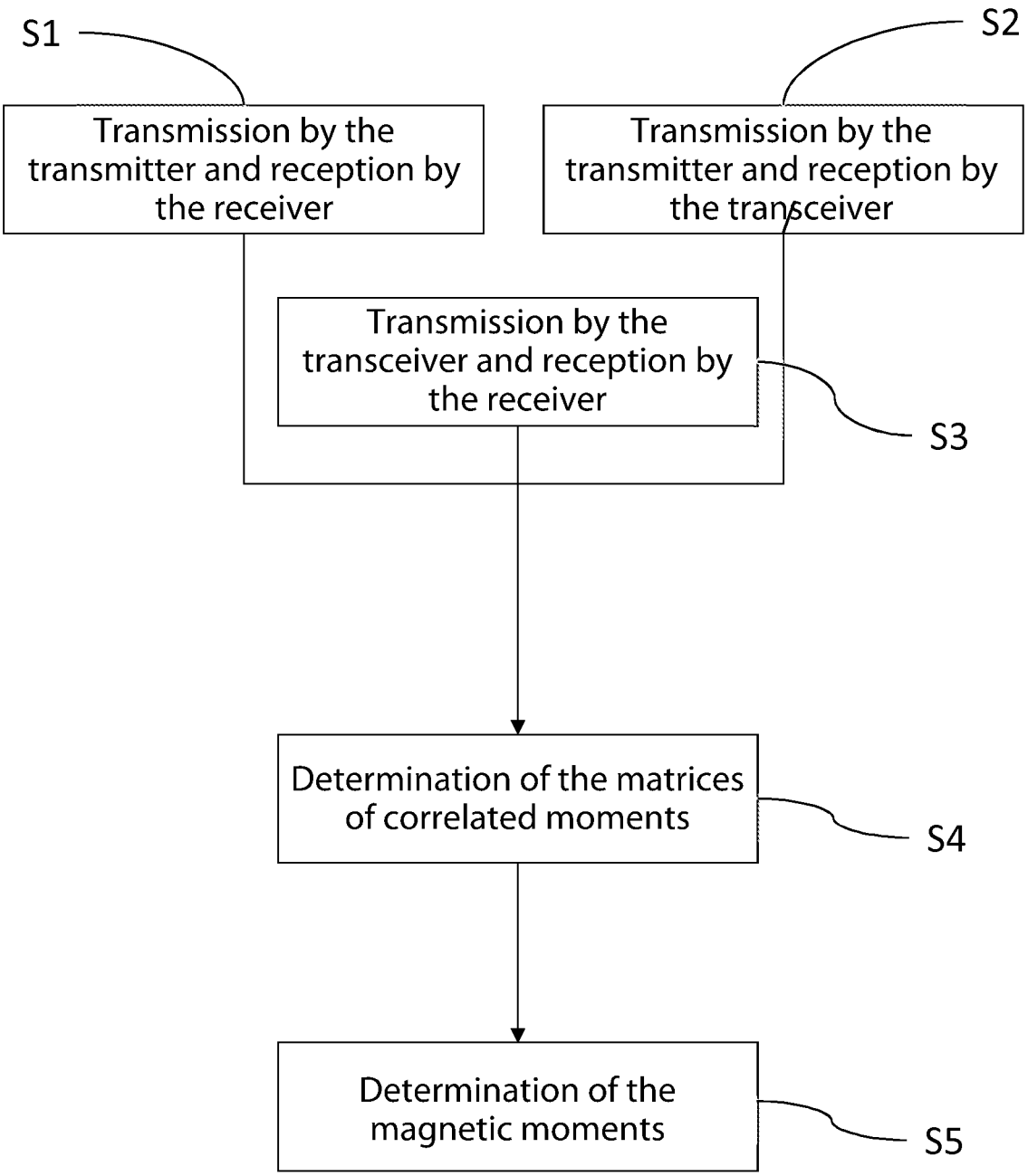

METHOD FOR CALIBRATING A MAGNETIC LOCATOR

The present invention relates to magnetic locators. More precisely, the invention pertains to a method for calibrating transmitters and receivers used for magnetic location.

A magnetic locator is generally composed of a transmission device, designated transmitter, constituted of one or more transmission coils rigidly connected to each other, and a reception device, designated receiver, constituted of one or more reception coils rigidly connected to each other. The joint analysis of the magnetic fields transmitted by the transmission coils and the fields measured by the reception coils makes it possible to determine the position and/or the orientation of the reception device with respect to the transmission device.

In such a system, the final precision of the location system depends notably on precise knowledge of the magnetic field transmitted by the transmission device and the characteristics of the reception device. The characteristics of the transmitted (or measured) magnetic field depend among other things on the magnetic moment of the transmission (or reception) coils as well as the orientation and the relative position of the different coils constituting the transmitter (or the receiver).

This knowledge of the characteristics of the transmitter and the receiver may be determined a priori from the constituent elements thereof. It involves however theoretical knowledge which necessitates imposing a very precise construction of the transmitter and the receiver and which requires great precision with regard to the characteristics of their constituent elements. This approach is costly and is not suitable when it is desired that the system is not very expensive such as for example in the case of a single use receiver.

Another approach is to determine a posteriori the characteristics of the transmitter and the receiver, by means of a calibration. A simple and not very expensive method for calibrating the transmitter and the receiver of a magnetic location system is to have them make predetermined relative movements or place them in precisely known relative positions, make the transmitter transmit a magnetic field, retrieve the quantities measured by the receiver, then search for the different calibration parameters which makes it possible to make the model of the theoretical field received coincide with the data actually measured.

One of the characteristics of which knowledge is required to implement the location is the magnetic moment. However, with the aforementioned method, the magnetic moments calibrated for the transmitter and the receiver are correlated. More precisely, instead of determining the magnetic moment of the transmitter $M_e$ and the magnetic moment of the receiver $M_r$ in an independent manner, this method only makes it possible to determine the product $M_e M_r$ of these magnetic moments. Knowledge of the product of the magnetic moments of a transmitter and a receiver is sufficient to implement a location method using this transmitter-receiver couple. However, the transmitter could not be used with another receiver (and the receiver with another transmitter) without having to be again calibrated. This method is thus not suitable when it is desired that the receiver is for single use.

DESCRIPTION OF THE INVENTION

The aim of the invention is to resolve at least one of the aforesaid drawbacks, by proposing a method for calibrating a transmitter and a receiver of a magnetic locator which is simple to implement, not very expensive, and which enables the decorrelation of the magnetic moments of the transmitter and the receiver.

To this end, a method for calibrating a magnetic locator is proposed, said magnetic locator including at least two sensors:
  a transmitter including at least one transmission coil,
  a receiver including at least one reception coil,
the method involving a third sensor constituted of a transceiver,
said method including, in any order:
  transmission of a first magnetic field by the transmitter and reception of first signals generated in the receiver by said magnetic field,
  transmission of a second magnetic field by the transmitter and reception of second signals generated in the transceiver by said magnetic field,
  transmission of a third magnetic field by the transceiver and reception of third signals generated in the receiver by said magnetic field,
the calibration method including the determination of at least a magnetic moment of the transmitter from the first signals, second signals and third signals and a magnetic moment of the receiver from the first signals, second signals and third signals.

The method is advantageously completed by the following characteristics, taken alone or according to any possible technical combinations thereof:
  the determination of at least a magnetic moment of the transmitter and a magnetic moment of the receiver includes:
    the determination of a first matrix of correlated magnetic moments from the first signals,
    the determination of a second matrix of correlated magnetic moments from the second signals,
    the determination of a third matrix of correlated magnetic moments from the third signals,
  the magnetic moment of the transmitter being determined from the first matrix of correlated magnetic moments, second correlated magnetic moments and third correlated magnetic moments, and the magnetic moment of the receiver being determined from the first correlated magnetic moment, second correlated magnetic moment and third correlated magnetic moment;
    the magnetic moment of the transmitter and the magnetic moment of the receiver are determined by minimising a criterion derived from the differences between:
      the first matrix of correlated moments and the product of the magnetic moment of the transmitter and the magnetic moment of the receiver,
      the second matrix of correlated moments and the product of the magnetic moment of the transmitter and the magnetic moment of the transceiver,
      the third matrix of correlated moments and the product of the magnetic moment of the transceiver and the magnetic moment of the receiver;
    during the transmission of a magnetic field by a sensor and the reception of signals by another sensor, said sensors are positioned in several different relative spatial configurations;
    at least one sensor is arranged on a plate turning around an axis of rotation such that an axis around which a coil of the sensor is wound is not colinear with the axis of rotation of the plate, and the spatial configuration of the sensor is modified by rotation of the plate between several predetermined positions;

the relative spatial configurations of the sensors are determined by the location of the sensors on images acquired by an imager;

the transmitter and the transceiver are rigidly connected such that their relative spatial configurations are invariant;

the steps of transmission of a first magnetic field by the transmitter and reception of first signals generated in the receiver by said magnetic field (S1) and of transmission of a third magnetic field by the transceiver and reception of third signals generated in the receiver by said magnetic field (S3), are carried out simultaneously.

The invention also relates to a computer product programme including programme code instructions recorded on a tangible computer readable support for the determination of at least one magnetic moment of the transmitter from the first signals, second signals and third signals and a magnetic moment of the receiver from the first signals, second signals and third signals during the implementation of the method according to the invention when said programme is run on a computer.

DESCRIPTION OF THE FIGURE

The invention will be better understood thanks to the description hereafter, which relates to the embodiments and the alternatives according to the present invention, given as non-limiting examples and explained with reference to the appended drawing of FIG. 1, which schematically illustrates the steps of the method according to a possible embodiment of the invention.

DETAILED DESCRIPTION

A magnetic location system is composed of at least two sensors:
a transmitter including at least one transmission coil,
a receiver including at least one reception coil.

Generally, the transmitter includes a number $N_e$ ($Ne>=1$) of transmission coils $Br_i$ rigidly connected to each other and oriented along distinct axes. The case of a system in which the transmitter is constituted of 3 transmission coils oriented along three distinct axes, for example along the three axes of an orthogonal frame, is considered here, as an example. These three axes of the respective magnetic moments of the coils may be merged with the winding axis of the coils in the case of a winding orthogonal to the winding axis. They may however be different if the winding is not at 90°, for example at 45°. When a voltage is imposed at the terminals of a transmission coil, a current circulates in the transmission coil which then generates a magnetic field proportional to the current that passes through it and of which the form depends on the characteristics of the coil (orientation, magnetic moment, form, etc.). A voltage source may, for example, be used to impose a voltage at the terminals of the transmission coil leading to the creation of a current. This voltage may, for example, be sinusoidal. The $N_e$ transmission coils may be subjected to voltages of different frequencies.

Similarly, the receiver generally includes a number $N_r$ of reception coils $Be_i$ rigidly connected to each other and oriented along distinct axes. The case of a system in which the receiver is constituted of 3 reception coils oriented along three distinct axes, for example along the three axes of an orthogonal frame, is considered here, as an example.

In the presence of a variable magnetic field, a voltage proportional to the variation in the flux of the magnetic field appears in the reception coil. By measuring the voltage at the terminals of the reception coil, using a voltmeter or other similar means, or by measuring the current passing through the reception coil by an ammeter or other similar means, it is possible to determine the magnetic field to which the reception coil is subjected, providing the characteristics of the reception coil are known, which include notably the magnetic moment of the reception coil.

The transmitter and the receiver are connected to a processing device, including for example a microprocessor connected on the one hand to the generator of the transmission device and on the other hand to the reading device of the reception device. The processing device is configured to process the signals transmitted and received, and thus makes it possible to find from the latter the position and the orientation of the receiver relative to the transmitter. The processing device receives information concerning the characteristics of the excitation signals applied to the transmission coils as well as information concerning the characteristics of the signals passing through the reception coils (representative of the field received by the reception coil). From the intensity of the fields captured by the reception coils, the processing device determines the position and/or the orientation of the set of reception coils with respect to the set of transmission coils.

More specifically, the processing device determines the ($Ne \times Nr$) field values corresponding respectively to the field received by the reception coil Br1 coming from the transmission coil Be1, the field received by the reception coil Br2 coming from the transmission coil Be2, etc. From these field values, the processing unit calculates the spatial coordinates of position and orientation of the set of reception coils with respect to the transmission coils using a minimisation algorithm, for example of Levenberg-Marquardt type, making it possible to minimise the error between the measured fields and the modelled theoretical fields from a priori knowledge of the transmitter and the receiver.

As explained previously, during a phase of use of the magnetic location system, the processing device uses à priori knowledge of the characteristics of the sensors and the characteristics of the field received by the receiver to find the relative positions of the sensors. During the calibration method, the inverse method is exploited, that is to say that knowledge of the relative positions of the system and the characteristics of the field received by the receiver are used to find the characteristics of the sensors.

During the proposed calibration method, the transmitter and the receiver are placed in relative positions known with precision or carry out relative displacements known with precision. At each position taken by the sensors, the system records the field received by the receiver when the transmitter transmits. The processing device is next used to search for the different characteristics of the coils by minimising the error between the measured field and the theoretical field generated using the model of the coils and from knowledge of the relative positions of the coils, using a minimisation algorithm, for example of Levenberg-Marquardt type.

Typically, the flux traversing a reception coil $B_r$ of magnetic moment Mr when a transmission coil $B_e$ of magnetic moment Me transmits may be modelled according to the dipolar model as below:

$$H_{e \to r} = M_r \vec{u_r} \cdot \left( \frac{\mu_0}{4\pi} Me \left( 3 \frac{\vec{r}(\vec{u_e} \cdot \vec{r})}{r^5} - \frac{\vec{u_e}}{r^3} \right) \right) = \frac{\mu_0}{4\pi} \frac{M_r M_e}{r^3} \vec{u_r} \cdot \left( 3 \frac{\vec{r}(\vec{u_e} \cdot \vec{r})}{r^2} - \vec{u_e} \right)$$

Where $\vec{r}$ represents the relative position vector between the centre of the reception coil $B_r$ and the transmission coil $B_e$, $\mu_0$ the magnetic permeability of a vacuum, $\vec{u_e}$ the unitary vector of the direction of the axis of the transmission coil, $\vec{u_r}$ the unitary vector of the direction of the axis of the reception coil. This gives $\vec{r} = \overrightarrow{O_{Be}O_{Br}}$ where $O_{Be}$ represents the centre of the transmission coil $B_e$ and $O_{Br}$ that of the reception coil $B_r$. This thus gives $\vec{r} = \overrightarrow{O_{Be}O_e} + \overrightarrow{O_eO_r} - \overrightarrow{O_{Br}O_r}$.

In the case of the calibration method, $\overrightarrow{O_eO_r}$ (relative position of the centre of the transmitter and the centre of the receiver) is thus known and it is sought to determine $\overrightarrow{O_{Be}O_e}$ (relative position of the considered transmission coil from the centre of the transmitter), $\overrightarrow{O_{Br}O_r}$ (relative position of the centre of the considered reception coil from the centre of the receiver), $\vec{u_e}$, $\vec{u_r}$, Me and Mr.

In the proposed method, the following characteristics are sought:
  Position of the centre of the coil: 3 components,
  Orientation of the axis of the coil: 2 components,
  Magnetic moment of the coil: 1 component.

For each coil of the transmitter or the receiver, 6 components are thus sought. Thus, it is necessary to retrieve at least 6 independent measurements and thus place the transmitter and the receiver in at least 6 different spatial configurations. It should be noted that this is not restrictive, other characteristics may be sought for the coils such as the thickness of the wire, the thickness of the winding, the length of the winding, etc.

Furthermore, to enable good calibration, it is preferable that the different positions tested make it possible to represent a sufficient variety of space. In order to ensure this, it is possible for example to use positions varying by rotations.

In the example hereafter, at least one plate turning around an axis of rotation is used to modify the position of at least one sensor, and thus the relative spatial configuration of the sensors, by rotation of the plate between several predetermined positions. This solution makes it possible to ensure a precise location and orientation of the displaced sensor, and thus improve the precision of the calibration. In addition, it is not necessary to determine precisely the placement of the sensors, it suffices to read a placement on the plate and the angles of rotation of the plate during changes in spatial configuration. A turning plate may for example take 6 or 12 different angular positions.

In order to make it possible to obtain a sufficient variety of positions and orientations, it is preferable to ensure that all the coils of the transmitter and the receiver have changed position and orientation at least once during the calibration method. To this end, preferably, the sensor is placed on the plate in such a way that none of the coils of said sensor has its axis of transmission colinear or close to the axis of rotation of the plate (typically an angle greater than 5° between the axes). Alternatively, it is possible to make several turns of the plate by placing at each turn the sensor in a different orientation and position.

The principle is thus to be placed in different positions (thus with different relative positions of the centre of the transmitter and the centre of the receiver $\overrightarrow{O_eO_r}$) and to look for the different characteristics in such a way as to minimise the error between the theoretical flux $H_{e \to r}$ traversing the reception coil and the flux $H_{mes}$ determined from measurements on the reception coil. However, the measured field then depends directly on the product of the moments $M_r M_e$. Thus, it is not possible to find precisely $M_r$ and $M_e$, but only the value of their product. The measurements thus give the matrix of the product of the moments:

$$M = \begin{pmatrix} M_{e1}M_{r1} & M_{e1}M_{r2} & M_{e1}M_{r3} \\ M_{e2}M_{r1} & M_{e2}M_{r2} & M_{e2}M_{r3} \\ M_{e3}M_{r1} & M_{e3}M_{r2} & M_{e3}M_{r3} \end{pmatrix}$$

The invention proposes using a third sensor constituted of a transceiver, in order to be able to determine individually the magnetic moment of the transmission coil and the magnetic moment of the reception coil. The transceiver of the third sensor operates as a transmitter when it is used to transmit a magnetic field, and as a receiver when it is used to determine the magnetic field to which it is subjected. The transceiver uses the same coil to do this, which is thus a transceiver coil.

A first couple is constituted of the transmitter and the receiver. The transmitter and the receiver are each arranged on a plate turning around an axis of rotation. There is thus a turning plate bearing the transmitter and a turning plate bearing the receiver. The two plates are placed at a determined distance from each other. A first magnetic field is then transmitted by the transmitter (step S1), which then generates first signals in the receiver, which are read. At least one turning plate is turned by a determined angle to change the spatial configuration, and other first signals are read. The operation is reiterated as many times as desired to obtain measurements at different spatial configurations.

The receiver is next replaced by the transceiver. A second magnetic field is then transmitted by the transmitter (step S2), which then generates second signals in the transceiver, which are read. As previously, the operation is reiterated as many times as desired to obtain measurements at different spatial configurations.

The transmitter is next replaced by the receiver. A third magnetic field is then transmitted by the transceiver (step S3), which then generates third signals in the receiver, which are read. As previously, the operation is reiterated as many times as desired to obtain measurements at different spatial configurations.

For each sequence, the measurements at different spatial configurations may be combined to make the determination of the characteristics of the sensors more precise, while becoming free of potential deviations resulting from a particular spatial configuration.

According to an alternative, it is possible that the transmitter and the transceiver are rigidly connected such that their relative spatial configurations are invariant. For example, the transmitter may be fixed on a part of a rigid support and the transceiver on another part of the same rigid support. The relative spatial configurations of the transmitter and the transceiver (position, orientation) may then be known. It should be noted that the transmission coil of the transmitter and the transceiver coil of the transceiver remain distinct.

In this case, the steps:
- of transmission of a first magnetic field by the transmitter and reception of first signals generated in the receiver by said magnetic field (S1) and
- of transmission of a third magnetic field by the transceiver and reception of third signals generated in the receiver by said magnetic field (S3), may be carried out simultaneously, in order to gain time. The transmitter and the transceiver, rigidly connected, are thus present at the same time as the receiver on the turning plate (or other device making it possible to know the different relative spatial configurations).

From the signals thereby read, it is possible to determine the matrices of the correlated moments (step S4). If the simplified case is taken of transmitters and receivers having only one coil, then this gives:
- a first correlated magnetic moment A from the first signals, which is equivalent to the product of the magnetic moment $M_e$ of the transmitter and the magnetic moment $M_r$ of the receiver:

$$A = M_e \times M_r$$

- a second correlated magnetic moment B from the second signals, which is equivalent to the product of the magnetic moment $M_e$ of the transmitter and the magnetic moment $M_{er}$ of the transceiver:

$$B = M_e \times M_C$$

- a third correlated magnetic moment C from the third signals, which is equivalent to the product of the magnetic moment $M_c$ of the transceiver and the magnetic moment $M_r$ of the receiver:

$$C = M_c \times M_r$$

From these three correlated magnetic moments A, B, and C, it is possible to determine the magnetic moment of the transmitter $M_e$ and the magnetic moment of the receiver $M_r$ (step S5).

More precisely, the magnetic moment of the transmitter $M_e$ is determined from the first correlated magnetic moment A, the second correlated magnetic moment B and the third correlated magnetic moment C. The magnetic moment of the transmitter $M_e$ in fact corresponds to:

$$M_e = \sqrt{\frac{AB}{C}}$$

The magnetic moment of the receiver is determined from the first correlated magnetic moment A, the second correlated magnetic moment B and the third correlated magnetic moment C. The magnetic moment of the receiver $M_r$ corresponds to:

$$M_r = \sqrt{\frac{AC}{B}}$$

It is also possible to determine the magnetic moment of the transceiver $M_C$, which corresponds to:

$$M_C = \sqrt{\frac{BC}{A}}$$

It is thus possible to find the magnetic moment of the different sensors, without correlation between them.

In the more general case (for example sensors with 3 coils), if the matrix notations of the magnetic moments of the sensors are introduced:

$$M_e = \begin{pmatrix} M_{e1} \\ M_{e2} \\ M_{e3} \end{pmatrix}, M_r = \begin{pmatrix} M_{r1} \\ M_{r2} \\ M_{r3} \end{pmatrix} et\ M_c = \begin{pmatrix} M_{c1} \\ M_{c2} \\ M_{c3} \end{pmatrix}$$

It is possible to determine the matrices of correlated magnetic moments of each couple of sensors:

A first matrix of correlated moments A from the first signals, which is equivalent to the product of the magnetic moment $M_{ei}$ of the coils of the transmitter and the magnetic moment $M_{ri}$ of the coils of the receiver:

$$A = \begin{pmatrix} M_{e1}M_{r1} & M_{e1}M_{r2} & M_{e1}M_{r3} \\ M_{e2}M_{r1} & M_{e2}M_{r2} & M_{e2}M_{r3} \\ M_{e3}M_{r1} & M_{e3}M_{r2} & M_{e3}M_{r3} \end{pmatrix} = M_e M_r^t$$

A second matrix of correlated moments B from the first signals, which is equivalent to the product of the magnetic moment $M_{ei}$ of the coils of the transmitter and the magnetic moment $M_{ci}$ of the coils of the transceiver:

$$B = \begin{pmatrix} M_{e1}M_{c1} & M_{e1}M_{c2} & M_{e1}M_{c3} \\ M_{e2}M_{c1} & M_{e2}M_{c2} & M_{e2}M_{c3} \\ M_{e3}M_{c1} & M_{e3}M_{c2} & M_{e3}M_{c3} \end{pmatrix} = M_e M_c^t$$

A third matrix of correlated moments C from the third signals, which is equivalent to the product of the magnetic moment $M_{ci}$ of the coils of the transceiver and the magnetic moment $M_{ri}$ of the coils of the receiver:

$$C = \begin{pmatrix} M_{c1}M_{r1} & M_{c1}M_{r2} & M_{c1}M_{r3} \\ M_{c2}M_{r1} & M_{c2}M_{r2} & M_{c2}M_{r3} \\ M_{c3}M_{r1} & M_{c3}M_{r2} & M_{c3}M_{r3} \end{pmatrix} = M_c M_r^t$$

As shown previously, the different non-correlated magnetic moments of the transmitter, receiver and transceiver may then be found from these three matrices using a minimisation algorithm. More precisely, the magnetic moments may be determined by minimising a criterion derived from the differences between:
- the first matrix of correlated moments and the product of the magnetic moment of the transmitter and the magnetic moment of the receiver,
- the second matrix of correlated moments and the product of the magnetic moment of the transmitter and the magnetic moment of the transceiver,
- the third matrix of correlated moments and the product of the magnetic moment of the transceiver and the magnetic moment of the receiver.

It is notably possible to use for example a minimisation algorithm of Levenberg-Marquardt type. From the matrices of correlated moments A, B and C, it is then sought to estimate the matrices $M_e$, $M_r$, and $M_c$ so as to minimise in the least squares sense the criterion G defined by the sum of the components to the square of the error matrix J defined by:

$$J = \begin{pmatrix} A - M_e M_r^t \\ B - M_e M_c^t \\ C - M_c M_r^t \end{pmatrix}$$

and $$G = \sum_i^9 \sum_j^3 J_{ij}^2$$

The invention is not limited to the embodiment described and represented in the appended FIGURE. Modifications remain possible, notably from the point of view of the constitution of the various technical characteristics or by substitution of equivalent techniques, without all the same going beyond the protection domain of the invention.

The invention claimed is:

1. Method for calibrating a magnetic locator, said magnetic locator including at least two sensors:
   a transmitter including at least one transmission coil,
   a receiver including at least one reception coil,
   wherein the method involves a third sensor constituted of a transceiver, said method including, in any order:
   transmission of a first magnetic field by the transmitter and reception of first signals generated in the receiver by said first magnetic field (S1),
   transmission of a second magnetic field by the transmitter and reception of second signals generated in the transceiver by said second magnetic field (S2),
   transmission of a third magnetic field by the transceiver and reception of third signals generated in the receiver by said third magnetic field (S3),
   the method including determining (S5) at least a magnetic moment of the transmitter from the first signals, second signals and third signals and a magnetic moment of the receiver from the first signals, second signals and third signals,
   wherein determining at least a magnetic moment of the transmitter and a magnetic moment of the receiver includes (S4):
   determining a first matrix of correlated magnetic moments from the first signals,
   determining a second matrix of correlated magnetic moments from the second signals,
   determining a third matrix of correlated magnetic moments from the third signals,
   the magnetic moment of the transmitter being determined from the first matrix of correlated magnetic moments, second correlated magnetic moments and third correlated magnetic moments, and the magnetic moment of the receiver being determined from the first correlated magnetic moment, the second correlated magnetic moment and the third correlated magnetic moment, and
   wherein the magnetic moment of the transmitter and the magnetic moment of the receiver are determined by minimising a criterion derived from differences between:
   the first matrix of correlated moments and a product of the magnetic moment of the transmitter and the magnetic moment of the receiver,
   the second matrix of correlated moments and a product of the magnetic moment of the transmitter and the magnetic moment of the transceiver,
   the third matrix of correlated moments and a product of the magnetic moment of the transceiver and the magnetic moment of the receiver.

2. The method of claim 1, wherein during a transmission of a magnetic field by a sensor and a reception of signals by another sensor, said sensors are positioned in several different relative spatial configurations.

3. The method of the claim 2, wherein at least one sensor is arranged on a plate turning around an axis of rotation such that an axis around which a coil of the sensor is wound is not colinear with the axis of rotation of the plate, and the spatial configuration of the sensor is modified by rotation of the plate between several predetermined positions.

4. The method of claim 2, wherein the relative spatial configurations of the sensors are determined by a location of the sensors on images acquired by an imager.

5. The method of claim 1, wherein the transmitter and the transceiver are rigidly connected such that their relative spatial configurations are invariant.

6. The method of the claim 5, wherein the steps:
   of transmission of a first magnetic field by the transmitter and reception of first signals generated in the receiver by said magnetic field (S1) and
   of transmission of a third magnetic field by the transceiver and reception of third signals generated in the receiver by said magnetic field (S3), are carried out simultaneously.

7. Non-transitory computer-readable medium including programme code instructions stored thereon for the determination of at least a magnetic moment of the transmitter from the first signals, second signals and third signals and a magnetic moment of the receiver from the first signals, second signals and third signals during the implementation of the method according to claim 1 when said non-transitory computer-readable medium is read by a computer.

* * * * *